United States Patent [19]

Douglass et al.

[11] 4,343,206
[45] Aug. 10, 1982

[54] SLIDE SYSTEM FOR MACHINE TOOLS

[75] Inventors: Spivey S. Douglass, Oak Ridge; Walter L. Green, Knoxville, both of Tenn.

[73] Assignee: The United States of America as represented by the United States Department of Energy, Washington, D.C.

[21] Appl. No.: 158,832

[22] Filed: Jun. 12, 1980

[51] Int. Cl.$^3$ .............................................. B23B 7/14
[52] U.S. Cl. .......................................... 82/2 R; 82/11
[58] Field of Search ............................. 82/2 R, 11, 12

[56] References Cited

U.S. PATENT DOCUMENTS

| | | | |
|---|---|---|---|
| 339,197 | 4/1886 | Latham | 82/11 |
| 1,238,934 | 9/1917 | Olson | 82/2 R |
| 1,537,059 | 5/1925 | Bausch | 82/12 |
| 2,691,312 | 10/1954 | Stewart | 82/11 |
| 3,566,722 | 3/1971 | Audet . | |
| 3,630,631 | 12/1971 | Becker | 82/2 R |
| 3,783,718 | 1/1974 | Kuhne et al. | 82/2 R |
| 3,835,588 | 9/1974 | Whitham . | |
| 4,016,784 | 4/1977 | Brown | 82/2 R |
| 4,080,853 | 3/1978 | Goto | 82/2 R |

FOREIGN PATENT DOCUMENTS 2427148  1/1975  Fed. Rep. of Germany ....... 82/2 R

Primary Examiner—Leonidas Vlachos
Attorney, Agent, or Firm—Earl L. Larcher; Stephen D. Hamel; Richard G. Besha

[57] ABSTRACT

The present invention relates to a machine tool which permits the machining of nonaxisymmetric surfaces on a workpiece while rotating the workpiece about a central axis of rotation. The machine tool comprises a conventional two-slide system (X-Y) with one of these slides being provided with a relatively short travel high-speed auxiliary slide which carries the material-removing tool. The auxiliary slide is synchronized with the spindle speed and the position of the other two slides and provides a high-speed reciprocating motion required for the displacement of the cutting tool for generating a nonaxisymmetric surface at a selected location on the workpiece.

2 Claims, 7 Drawing Figures

SLIDE SYSTEM FOR MACHINE TOOLS

The present invention was made as a result of a contract with the U.S. Department of Energy.

BACKGROUND OF THE INVENTION

The present invention relates generally to metalworking machines employing slide systems and, more particularly, to a machine tool provided with an auxiliary slide used in conjunction with a conventional two-slide system for selectively displacing the cutting tool for machining "off axis" surfaces on a workpiece.

The machine tools or turning machines usually comprise a base of generally T-shaped configuration upon which a pair of slides are mounted for movement in directions normal to one another. The X slide, or cross slide, normally carries the material-removing or cutting tool while the workpiece is mounted on a spindle carried by the Y slide. Slide motions are usually provided by the rotation of precision lead screws driven by electric, pneumatic or hydraulic motors. The path, position, and velocity of the slides may be manually provided or automatically controlled by taped control units.

Conventional machine tools, as briefly described above, are primarily confined to the generation of contours where all cross sections perpendicular to the axis of symmetry are circular. Noncircular or nonaxisymmetric cross sections can be produced by such machine tools by driving one of the two slides synchronously with the spindle rotation to generate a nonaxisymmetrical surface on the workpiece. Such machining has been found to be essentially unattainable with most metals due to relatively high spindle speed requirements which render the synchronization of the slide position with the spindle rotation extremely difficult. Further, conventional X-Y machine-slide systems are relatively massive so that the speed and motion of the slides necessary to provide satisfactory nonaxisymmetric contours cannot be satisfactorily achieved. For example, a parabolic surface can be generated or produced on a workpiece by rotating the workpiece about its axis of symmetry. However, and "off axis" parabolic sector on the parabolic surface is not a figure of revolution about an intersecting axis and cannot be readily machined by "on axis" turning of the workpiece by using previously known machine tools employing conventional X-Y slide systems. The generation of such an "off axis" sector by a conventional machining mechanism requires either that the entire parabolic surface be tracked to obtain only the isolated sector or that a relatively expensive hand-working operation be utilized to form the selected sector. Further, the problems associated with the generation of nonaxisymmetric sectors by conventional methods become increasingly more difficult as the radial spacing of the sector increases from the axis of symmetry.

SUMMARY OF THE INVENTION

It is the primary aim, or goal, of the present invention to provide a machine tool which is readily capable of generating nonaxisymmetric surfaces or sectors on workpieces being turned about the axis of symmetry of the workpiece. The objectives of this invention are achieved by employing a machine tool which comprises a spindle for supporting the workpiece for the rotation of the latter about an axis through its center; a first slide means for supporting a material-removing tool in a working relationship with the surface of said workpiece and for displacing the material-removing tool in opposite directions along a plane perpendicular to the axis of symmetry of the workpiece; a second slide means which may be used for supporting the spindle and displacing it in opposite directions along a plane parallel to the axis of symmetry of the workpiece or for supporting the first slide means and displacing it along a plane parallel to the axis of rotation of the workpiece; and a third slide disposed intermediate the first slide means and the material-removing tool for carrying the latter and displacing it in opposite directions along a plane radially spaced from the axis of rotation to generate on the workpiece a surface nonaxisymmetrically oriented with respect to the axis of rotation. The displacement of the third slide means is regulated by a control responsive to a predetermined angular position of the workpiece and the linear position of the first slide means. The control is coupled to the drive means of the third slide means for displacing the latter and the material-removing tool carried thereby a selected distance in either direction along the plane of displacement of the third slide means for providing the workpiece with the nonaxisymmetric surface.

The nonaxisymmetric machining capabilities of the present invention are particularly advantageous for generating nonaxisymmetric surfaces of configurations which could not be generated on workpieces by using most known lathe systems since the diameter of the workpiece required for generating off-axis sectors of the desired configuration would be too large for the lathe to handle.

Other and further objects of the invention will be obvious upon an understanding of the illustrative embodiment about to be described or will be indicated in the appended claims, and various advantages not referred to herein will occur to one skilled in the art upon employment of the invention in practice.

DESCRIPTION OF THE ACCOMPANYING DRAWINGS

Figure 7:
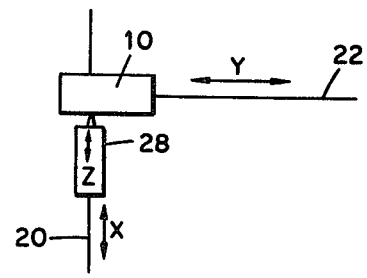
Figure 6:
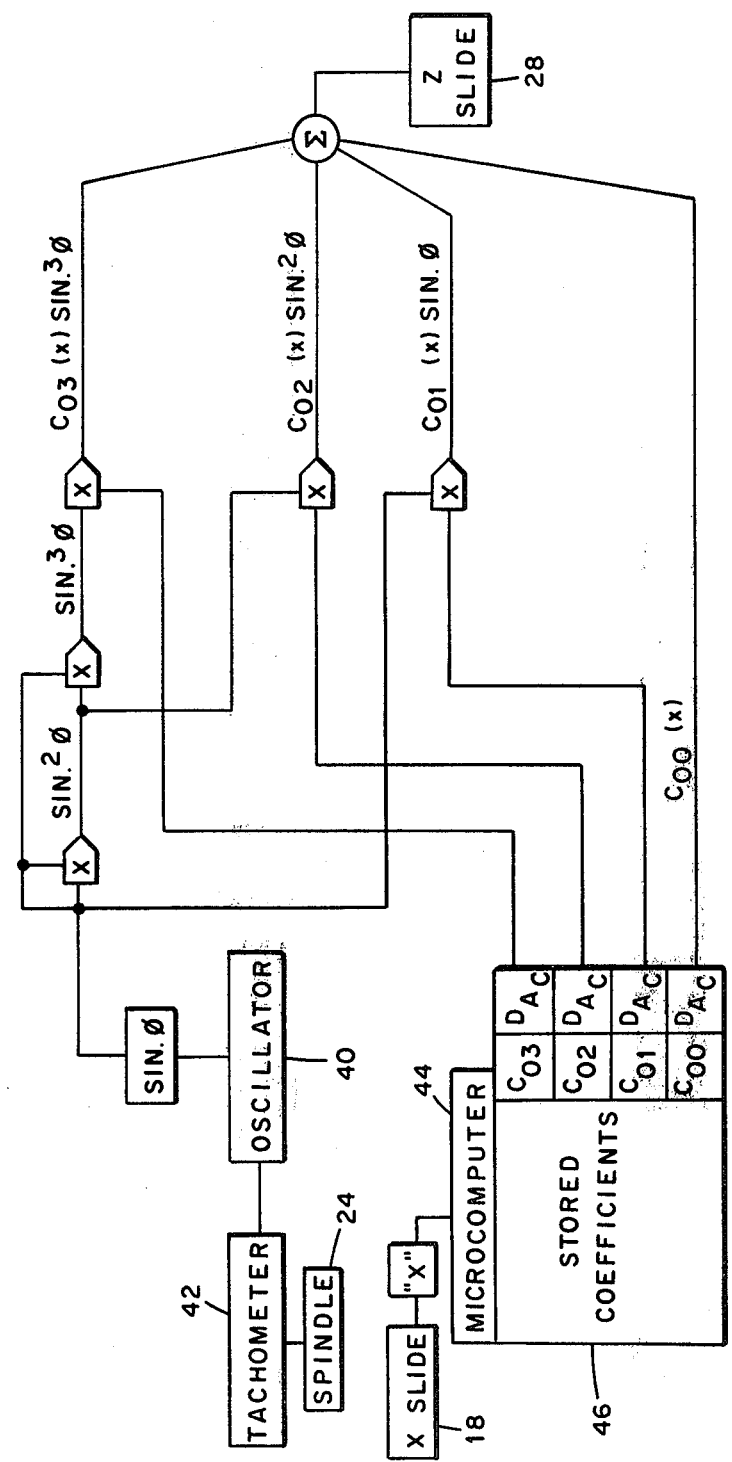

FIG. 6 is a schematic diagram illustrating a control system for synchronizing the displacement of the auxiliary slide with the angular displacement of the workpiece, and FIG. 7 schematically shows an alternate embodiment wherein the auxiliary or Z slide is shown mounted for movement parallel with the displacement of the X slide for machining asymmetric surfaces on workpieces such as solid cylinders.

Figure 4:
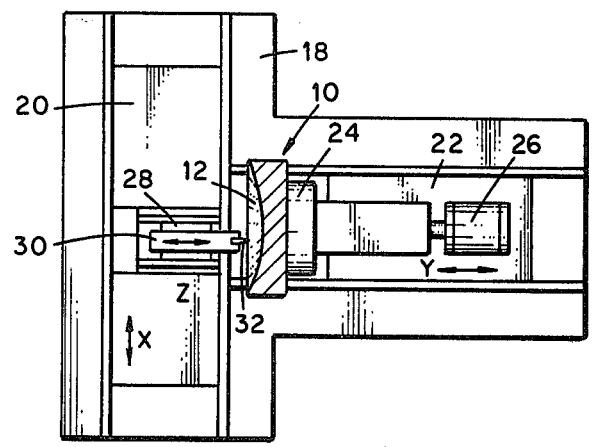
FIG. 4 is a schematic plan view of a machine tool employing X-Y slide systems together with the novel slide system (Z slide) of the present invention.
Figure 5:
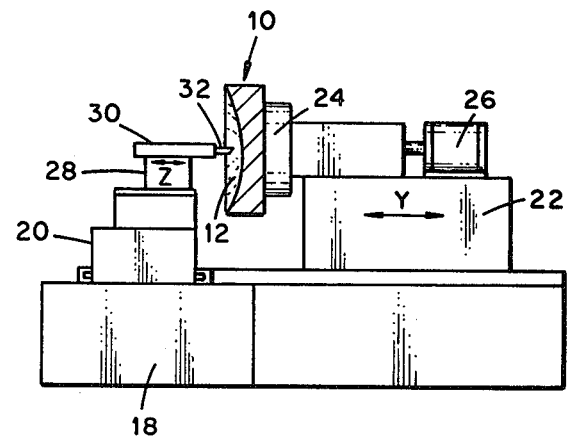
FIG. 5 is an elevational view showing further details of the machine tool of FIG. 4.

A preferred embodiment of the invention has been chosen for the purpose of illustration and description. The preferred embodiment illustrated in FIGS. 4 and 5 is not intended to be exhaustive or to limit the invention to the precise form disclosed. It is chosen and described in order to best explain the principles of the invention and their application in practical use to thereby enable others skilled in the art to best utilize the invention in various embodiments and modifications, such as the FIG. 7 arrangement, as are best adapted to the particular use contemplated. Also, while the invention is illustrated with a system having the spindle disposed on the Y-slide it will appear clear that the present invention may be readily used on a machine having stacked slides with a fixed spindle as in a conventional lathe.

DESCRIPTION OF THE INVENTION

Figures 1, 2:
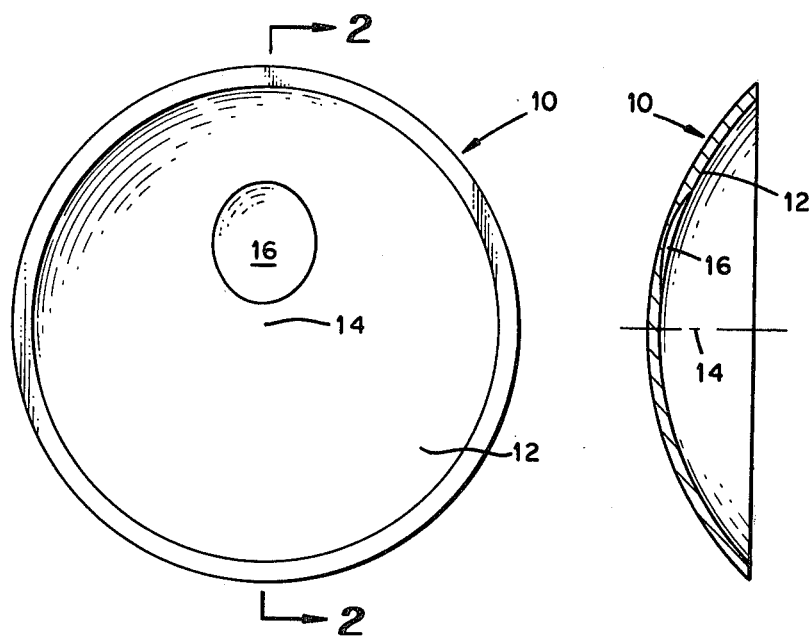
FIG. 1 shows a workpiece in which a parabolic surface has been generated by rotating the workpiece around a central axis of rotation and which includes an off-axis, or nonaxisymmetric, sector generated in a portion of the parabolic surface by using the novel auxiliary slide arrangement of the present invention.
FIG. 2 is a sectional view taken along lines 2—2 of FIG. 1 showing details of the parabolic surface and the off-axis sector generated in the parabolic surface.
Figure 3:
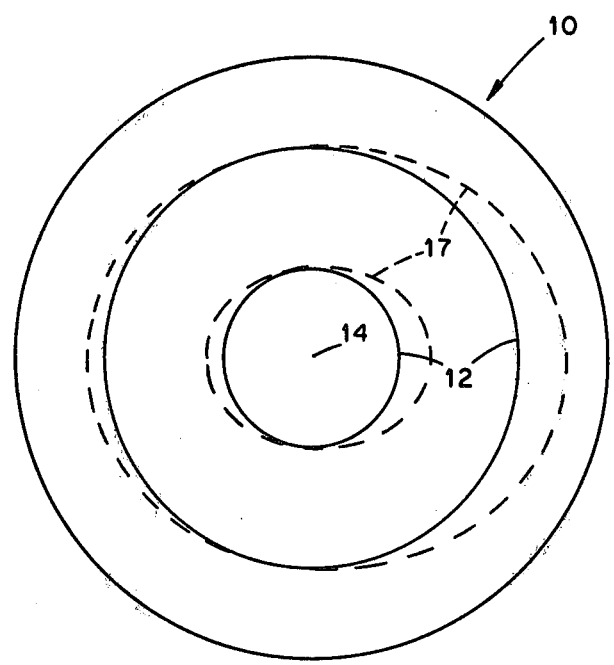
FIG. 3 is a plan view of a workpiece in which an axisymmetrical surface indicated by the solid lines may be machined by the present invention to provide a nonaxisymmetrical surface as indicated by the dotted lines.

With reference to FIGS. 1–5, the present invention is shown directed to a lathe system employing a boring bar for generating a nonaxisymmetric surface on a workpiece 10 which is characterized by a parabolic surface 12 which may be machined at the same time or prior to the generation of the nonaxisymmetric surface. The parabolic surface 12 may be machined in the workpiece 10 by rotating or turning the workpiece 10 about a central axis 14 concentric with all points on the surface 12. As shown in FIGS. 1 and 2, a nonaxisymmetric sector 16 is generated in a portion of the parabolic surface at a location radially spaced from the axis of rotation 14. While the sector 16 is shown in a generally oval configuration in the parabolic surface 12, it will appear clear that the entire workpiece or any selected portion thereof may be machined by the present invention so as to provide it with a nonaxisymmetrical surface of the desired size such as the entire surface 17 of the workpiece 10 as shown in FIG. 3. Also, with the relatively rapid displacement of the Z slide, the lathe system of the present invention may be utilized for machining complex surfaces or surface portions.

The machining of such an off-axis or nonaxisymmetric sector, such as shown at 16, in a parabolic or other configured surface of a workpiece may be provided by a machine tool employing an auxiliary slide in accordance with the teachings of the present invention. As shown in FIGS. 4 and 5, the machine tool comprises a generally T-shaped base 18 upon which an X slide 20 and a Y slide 22 are mounted in a suitable conventional manner for displacement in any desired manner along planes disposed perpendicular to one another as conventionally practiced. The Y slide 22 is provided with a conventional spindle mechanism generally shown at 24 and which is rotated by a suitable drive motor shown at 26.

A third slide or auxiliary slide referred to herein as the Z slide is shown at 28 and is movably mounted on the X slide 20. The Z slide 28 is shown supporting a conventional tool holder 30 and metal-working tool 32 for machining the surface 12 of the workpiece 10 upon contact therewith.

To machine one or more nonaxisymmetric sector surfaces, such as shown at 16 in FIGS. 1 and 2 or the entire surface as shown at 17 in FIG. 3, in a workpiece being rotated about a central axis of rotation, the auxiliary slide 28 is displaced at a relatively rapid rate toward or away from the surface of the workpiece in accordance with a predetermined program so as to provide the off-axis sector. For example, in cutting or turning a sector such as 16 the auxiliary slide 28 would be displaced in accordance with a signal generated by a predetermined angular position of the workpiece and by predetermined linear position of the cross slide 20 so that the machine tool 32 is displaced inwardly and then outwardly very rapidly to generate the surface 16 in surface 12 while the workpiece 10 is rotating. This high speed Z slide movement is shown in FIGS. 4 and 5 to be in the direction normal to the travel of the X slide to generate the nonaxisymmetric surface 16. This motion of the Z slide is synchronized with the motion of the X and Y slides as well as the rotational velocity of the spindle as will be discussed in greater detail below.

The Z slide 28 is mounted on the X slide 20 in such a manner as to provide for the displacement thereof at a velocity significantly greater than that of the X or Y slides. A desirable mounting arrangement which may be utilized for the Z slide is an air-bearing type slide support which facilitates the displacement of the Z slide. A suitable drive (not shown) for rapidly displacing the Z slide may be a linear motor, or a hydraulic or a pneumatic servo motor. However, if desired, the Z slide may be moved manually if the tolerance level of the machining is not significantly high. Normally, the Z slide should be mounted to travel as much as about 2 inches. However, for most off-axis machining the travel of the Z slide will probably be significantly less than 1 inch.

As shown in FIGS. 4 and 5 the X and Y slides will generate the linear motions necessary for machining the parabolic surface 12 while the Z slide is displaced parallel to the Y slide direction to produce the rapid motion necessary to produce or generate the nonaxisymmetric surfaces 16 and 17 in the workpiece. The displacement of the X and Y slides may be in any conventional manner, such as the conventional tape controlled unit. However, additional control systems may be preferably utilized with the Z slide to assure accuracy of the control.

A suitable displacement control for the Z slide may be derived by an equation for locating the position of the Z slide which is expressed in the equation as a function of the X axis and the angular position of the spindle. Thus, knowing the spindle angle and the X slide position, the Z slide commands can be generated in real time by employing a digital processor together with analog circuitry. These commands may be transmitted to the Z slide drive independently of the X-Y slide controls. As shown in FIG. 6, an analog signal representing the sum of weighted powers of the sine of the spindle angular position is utilized to provide the command inputs to the Z slide drive mechanism. As shown, an analog signal indicative of the spindle angular position may be obtained by using a voltage controlled sinusoidal oscillator 40 driven by a tachometer 42 attached to the spindle 24. The voltage produced from the tachometer 42 is proportional to the rotational speed of the spindle 24 and can be utilized to indicate the sine of the position angle of the spindle where the reciprocation of the X slide occurs to machine the off-axis sectors. A mark on the spindle periphery may be sensed by a photodiode to provide a signal pulse for reducing the cumulative error from the tachometer 24 with this pulse being utilized to reset integrators to initial conditions upon each spindle rotation.

The command signals to the Z slide control system utilize a signal from the oscillator 40 for providing an analog signal proportional to the sine of the spindle angular position for one input to the Z slide. Another signal necessary to complete the command input to the Z slide control is the X slide position which is obtained by any suitable means, such as laser interferometer or other measuring mechanism, capable of accurately indicating the position of the X slide. This signal indicative of the X slide position is transmitted to a microcomputer 44 which at selected X positions permits new coefficient data from a suitable collection of stored coefficients 46 to flow through a plurality of digital-to-analog converters (DAC) 48. Each of these analog coefficient signals is then multiplied by an appropriate power of sine of the spindle angle and these products are summed to yield the command input to the drive system for the Z slide 28 for machining a nonaxisymmetric surface of the desired configuration in a workpiece being rotated about a central axis of rotation.

As generally shown in FIG. 7, the Z slide 28 is mounted upon the X slide 20 for displacement in a direction parallel to the displacement of the X slide 20. This configuration allows for the rapid deployment of the Z slide 28 to machine surfaces in the workpiece 10 that cannot be achieved with the capabilities of the conventional X slide system 20. The displacement of the Z slide 28 in FIG. 7 may be achieved by employing a control mechanism similar to that shown in FIG. 6.

It will be seen that the present invention provides an improved turning machine wherein nonaxisymmetric surfaces may be generated on workpieces being turned about a central axis of rotation in a highly efficient and accurate manner so as to provide a significant advancement in the machining art.

What is claimed is:

1. A machine tool for shaping a workpiece with a nonaxisymmetric surface by turning the workpiece about a central axis of rotation comprising:
    a spindle supporting the workpiece for rotation thereof about said axis,
    first and second slide means movable along planes normal to one another with the first of said slide means supporting a material-removing tool in a working relationship with the surface of said workpiece and providing for the displacement of the material-removing tool in opposite directions along a plane perpendicular to the axis of rotation of the workpiece, and the second slide means supports said spindle for displacing the latter in opposite directions along a plane parallel to the axis of rotation of the workpiece,
    third slide means disposed intermediate said first slide means and the material-removing tool for carrying the latter and for displacing the material-removing tool in opposite directions along a plane radially spaced from said axis of rotation to generate a nonaxisymmetric surface on said workpiece, and means coupled to said third slide means and responsive to a predetermined angular position of said workpiece and the position of said first slide means for displacing the material-removing tool carried by said third slide means a selected distance in either direction along the plane of displacement of said third slide means for providing said workpiece with said nonaxisymmetric surface.

2. The machine tool as claimed in claim 1, wherein said third slide is disposed on said first slide means for displacement in a plane perpendicular to the plane of displacement of said first slide means.

* * * * *